Nov. 24, 1953
T. A. FEENEY ET AL
2,660,383
ELEVON STICK CONTROL
Filed Feb. 21, 1949
2 Sheets-Sheet 1
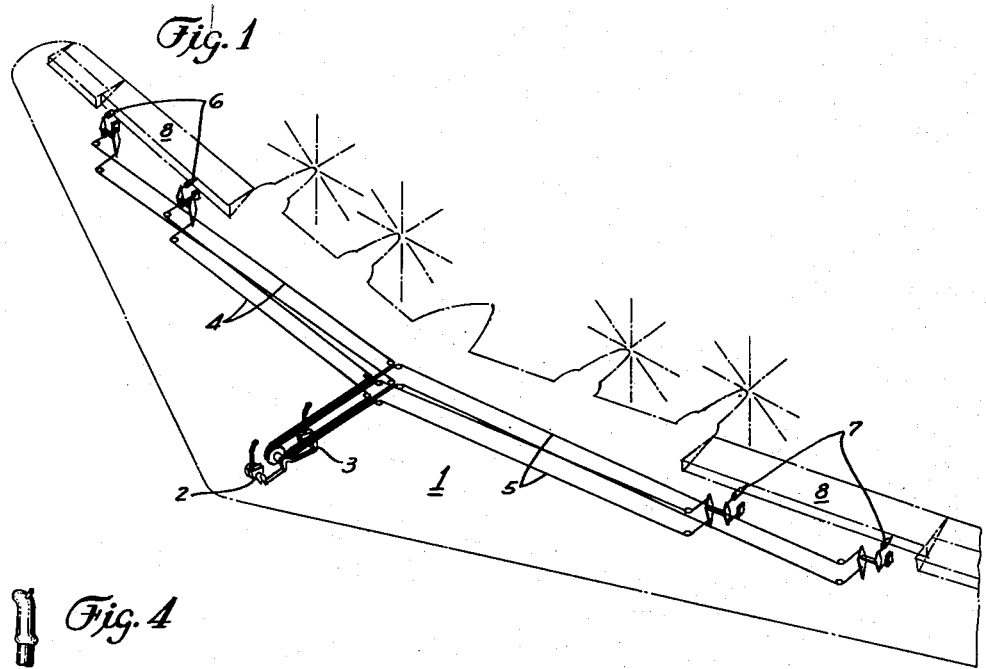
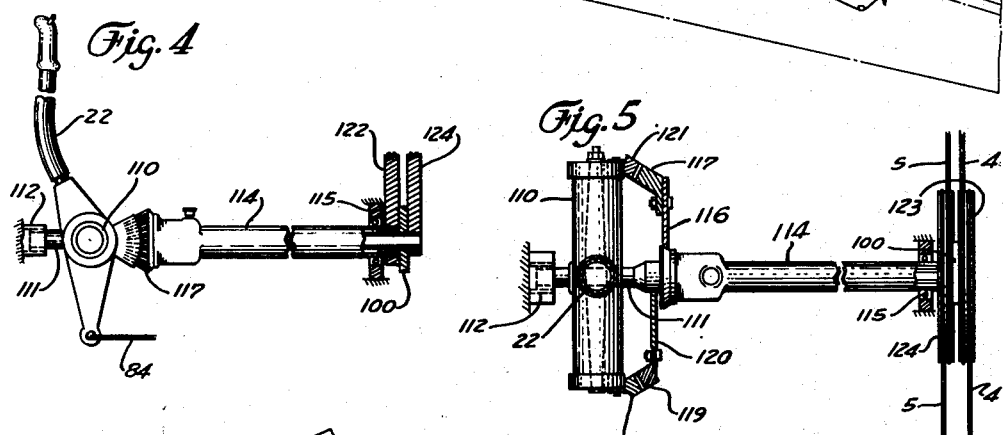
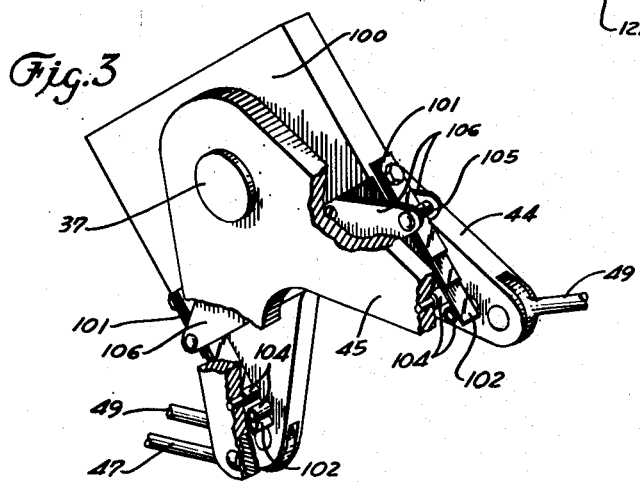
INVENTORS
THOMAS A. FEENEY
WALLACE B. PIERCE
BY
Herbert E. Metcalf
Attorney

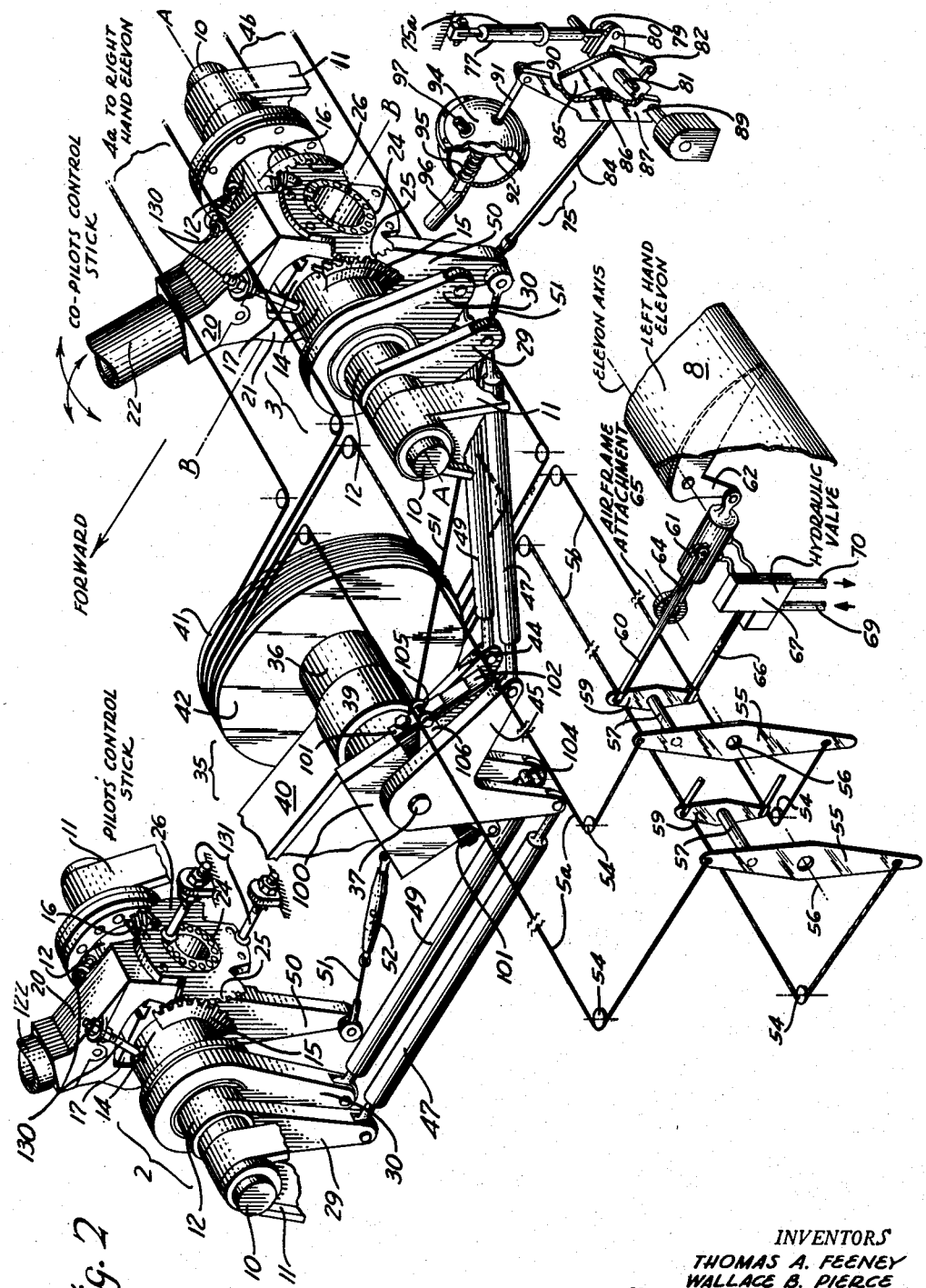

Patented Nov. 24, 1953

2,660,383

UNITED STATES PATENT OFFICE 2,660,383

ELEVON STICK CONTROL

Thomas A. Feeney, Los Angeles, and Wallace B. Pierce, Burbank, Calif., assignors to Northrop Aircraft, Inc., Hawthorne, Calif., a corporation of California Application February 21, 1949, Serial No. 77,592

4 Claims. (Cl. 244—83)

1

The present invention relates to airplane controls, and more particularly the invention relates to a stick control for airplane elevons.

Some airplanes, particularly those airplanes of the all-wing or tailless types, utilize a control surface called an elevon, mounted as part of the trailing edge of each wing panel. Means are then provided so that the pilot can move these control surfaces simultaneously in the same direction for elevation control of the airplane and simultaneously in opposite directions for lateral control of the airplane. Thus the functions of the elevators and the ailerons of conventional airplanes are combined, only two surfaces being necessary for the combined functions.

It is however, highly desirable that the pilot's control element be so connected to the elevons that this element can be moved for elevation and lateral control of the airplane, in exactly the same manner as the pilot's control element is moved in conventional airplanes utilizing separate elevators and ailerons.

It is an object of the present invention to provide an elevon control system wherein the pilot's control element is a stick, and wherein control of the airplane is obtained by stick movements substantially the same as employed for airplane controls in conventional airplanes having both elevators and ailerons connected to the stick.

It is another object of the invention to provide a simple and positive stick control for airplane elevons.

In some large airplanes, such as, for example, the U. S. A. F. bombers B-35 and B-49, which are of the all-wing type, the elevons are entirely power operated in accordance with movements of the pilot's control element. In such powered systems, no significant force need be exerted by the pilot in handling the airplane, the movements of the pilot's control element transmitting only forces having the nature of signals to operate the elevon motors. In such cases backlash in the system should be held to the minimum.

Furthermore, in such large airplanes, both a pilot's and copilot's stick control is required, with linkage therebetween. This linkage also contributes to the production of backlash.

It is still another object of the present invention to provide an elevon control system having means included therein to minimize backlash in the system, even when dual pilots' controls are installed.

It has not heretofore been thought practical to control an airplane as large as the U. S. A. F. bombers referred to above (210,000 lbs. gross weight) with a stick. However, the present invention makes a stick control practical for airplanes of any size, particularly when the control surfaces are full power operated. These and other advantages and objects of the present invention will be more apparent from the ensuing description of the appended drawings, which show, partly diagrammatically, an elevon control system embodying preferred forms of the invention.

In the drawings:

Figure 1 is a schematic perspective view of an all-wing airplane showing an elevon control system embodying the present invention.

Figure 2 is a perspective view, partly diagrammatic, showing a preferred embodiment of the present invention as used in the system of Figure 1.

Figure 3 is a perspective view of a spring assembly forming a part of the device of Figure 2.

Figure 4 is a side view, partly in section, of a modification of the present invention.

Figure 5 is a top view, partly in section, of the modification shown in Figure 4.

The general layout of an elevon control system embodying the present invention is shown in Figure 1, as utilized in an all-wing, propeller driven airplane 1. Centrally, a pilot's stick assembly 2 and a copilot's stick assembly 3 are connected to move right and left hand cables 4 and 5 respectively, these cables being connected to operate right and left hand pairs of hydraulic motors 6 and 7 respectively. Each pair of hydraulic motors moves an elevon 8 positioned to swing vertically in the trailing edge of the airplane when the airplane is level.

The elevons 8 are moved in the same direction for elevation control, and in the opposite direction for lateral control of the airplane. The mechanism for causing such movement is shown in Figures 2 and 3 which will next be referred to.

The system shown in Figure 2 includes the pilot's control stick assembly 2 and a copilot's control stick assembly 3. As the stick assemblies are substantially alike, only the copilot's assembly 3 will be described, the pilot's assembly 2 being given the same numerals for the same parts.

A stationary support shaft 10 is provided mounted in brackets 11 attached to the airplane to extend laterally in the airplane at right angles to the center line thereof. Mounted to rotate freely on shaft 10 is a long sleeve 12, and mounted to rotate freely on long sleeve 12 is a short sleeve 14. Long sleeve 12 carries a rearwardly extending right elevon bevel gear sector 16 and short sleeve 14 carries a rearwardly extending left elevon bevel gear sector 15 near the inner end thereof. A yoke block 17 is positioned to rotate freely on long sleeve 12 between the two gear sectors 15 and 16. It will thus be seen that long sleeve 12, short sleeve 14 and yoke block 17 all rotate around a common axis A—A i. e. the center line of shaft 10, and that this common axis is at a right angle to the center line of the airplane.

A stick yoke 20 is mounted with yoke legs 21 fore and aft of yoke block 17 to rotate with respect to yoke block 17 on an axis B—B at right angles to and intersecting common axis A—A. Thus axis B—B is parallel to the center line of the airplane. A control stick 22 is extended upwardly from stick yoke 20. On the rear leg of yoke 20 is positioned a gear plate 24 having laterally extending driving gear sectors 25 and 26, formed as a part thereof. Driving gear sectors 25 and 26 are bevel gear sectors, and mesh respectively with driven gear sectors 15 and 16.

The outer end of long sleeve 12 adjacent shaft bracket 11 is provided with a right elevon lever 29, and the adjacent end of short sleeve 14 is provided with a left elevon lever 30.

Between the pilot's stick assembly 2 and the copilot's stick assembly 3 is positioned a cable drive assembly 35.

Cable drive assembly 35 comprises an outer pulley sleeve 36 rotating on an inner concentric pulley shaft 37. Outer pulley sleeve 36 rotates in an assembly bearing 39 supported by assembly bracket 40 from the airframe.

A right elevon pulley 41 is mounted on one end of inner shaft 37 and a left elevon pulley 42 is mounted on the adjacent end of outer sleeve 36. The other end of outer sleeve 36 is attached to a left elevon drive crank 44 and the other end of inner shaft 37 is attached to a right elevon drive crank 45. Drive cranks 44 and 45 are of inverted V shape, and have their respective opposite legs substantially parallel to the right and left elevon levers 29 and 30 of the pilot's and copilot's stick assemblies 2 and 3 respectively. The two legs of the right elevon drive crank 45 are attached to the respective right elevon levers 29 of both the pilot's and copilot's stick assemblies 2 and 3, by right elevon drive rods 47, and the two legs of the left elevon drive crank 44 are connected to the respective left elevon levers 30 of both pilot's and copilot's stick assemblies 2 and 3 by left elevon drive rods 49.

The yoke blocks 17 in both the pilot's and copilot's stick assemblies 2 and 3 carry downwardly extending backlash levers 50 attached respectively to the lower sides of the yoke blocks, these levers being connected by a backlash cable 51, which includes a turnbuckle 52.

Each elevon pulley 41 and 42 drives four cables extending outwardly in the wing panels to the control surface motors, 6 or 7 as the case may be. As both sides of the system are symmetrical, only the left side will be shown and described in Figure 2.

The left elevon pulley 42 when rotated drives two upper cables 5a and two lower cables 5b. These cables are led to the wing panels on cable pulleys 54. One upper cable 5a and one lower cable 5b terminate on opposite ends of a valve lever 55 and the other upper and lower cable likewise terminate in a similiar valve lever. As two surface control motors are used and both motor systems are alike, only the connections of one of them will be described.

Valve lever 55 is preferably vertically mounted to be rotated by cables 5a and 5b on a central pivot 56. Above pivot 56, and between pivot 56 and the attachment of upper cable 5a, a pin 57 is extended laterally to carry an operating lever 59 freely rotatable on pin 57. The upper end of operating lever 59 is attached to a feed back rod 60 extending rearwardly to enter the elevon 8 hinged to swing vertically on the airframe of the airplane. Within elevon 8, rod 60 is pivoted to the side of a hydraulic cylinder 61 which, at one end thereof is attached to an operating arm 62 of elevon 8.

The piston (not shown) inside hydraulic cylinder 61 is attached to a piston rod 64 extending forwardly to terminate in an attachment fitting 65 to tie the rod to the airframe.

The lower end of operating lever 59 is connected to a valve operating rod 66 extending rearwardly to enter a hydraulic valve 67. This valve which is mounted on the airframe is connected to a hydraulic pressure line 69 and a fluid return line 70. The valve 67 controls the admittance of hydraulic fluid under pressure to opposite sides of the piston in cylinder 61. The movement of valve operating rod 66 causes the elevon to be moved by the hydraulic motor described, and the resultant movement of the elevon 8 and attached cylinder 61 acting through feed-back rod 60 and valve operating lever 59 and valve rod 66 causes the surface to stop at a position as determined by the amount of cable movement. This type of full power surface control is more fully described in a prior application by one of us (Feeney) Serial No. 23,567, filed April 27, 1948.

As it is apparent that no feel-back to the pilot can be provided by the motor system above described, and that the only force required to be exerted by the pilot is that sufficient to overcome friction in the system and to move valve operating rod 66 in valve 67, a synthetic feel is provided for the stick.

For the elevator action of the stick, a force producing assembly 75 is attached to the backlash lever 50 of the copilot's control stick assembly 3. This force producing assembly 75 consists of a force spring assembly 75a having a casing 77 attached to the airframe, and having a spring rod 79 emerging therefrom and attached to a rod arm 80 mounted on a force spring shaft 81. Casing 77 contains a spring (not shown) that is compressed by movement of spring rod 79 away from a neutral position in either direction.

Shaft 81 also carries a connecting lever 82 extending downwardly to join a connection rod 84 extending forwardly to connect with the lower end of backlash lever 50 of the copilot's stick mechanism. Shaft 81 also carries a concave cam 85 on which rides a cam roller 86 attached to a vertical cam lever 87 about midway between a pivot end 89 and a diaphragm rod end 90 of this cam lever.

The diaphragm rod end 90 of cam lever 87 is attached to a diaphragm rod 91 extending forward to join a diaphragm 92 inside of a pressure casing 94 bisected by diaphragm 92. Forward of diaphragm 92, a diaphragm spring 95 urges diaphragm 92 rearwardly so that roller 86 on cam lever 87 will at all times, when the force spring assembly 75a is centering spring rod 79, tend to seek the lowest position of cam 85.

To provide a force varying in accordance with airspeed, the front of diaphragm 92 is supplied with ram air through ram air duct 96 and the rear of the diaphragm is connected to a source of static pressure through static air duct 97. Thus pressure developed by diaphragm 92 acts, through roller 86 and cam 85 to center the stick. The stick centering force will be a force due to the force spring assembly plus a force derived from airspeed. This latter force, varying as it does with airspeed, provides the pilot with a stick force simulating the aerodynamic force acting on the elevons, when the stick is moved in elevation controlling directions.

The stick is centered for aileron action solely by spring action. The centering springs used for this purpose are positioned to act on the drive cranks, 44 and 45 and are best shown in Figure 3.

Positioned between the right and left elevon drive cranks 44 and 45, mounted to rotate freely on inner shaft 37 is a spring block 100 having leaf springs 101 attached to opposite sides thereof and extending downwardly to terminate adjacent the ends of the legs of cranks 44 and 45, with one spring between the forelegs of the drive cranks, and the other spring between the aft legs of the drive cranks. The longest levers 102 of the spring face each other.

Closely adjacent the end of each spring 101, a roller 104 is extended from each leg of the drive cranks 44 and 45 in a position so that these rollers contact the inner surfaces of the leaf springs, near the free ends thereof, with the rollers of the left elevon crank 44 positioned just below the rollers of the right elevon crank 45. The leaf springs 101 are flexed around roller fulcrum pins 105 that are mounted between fulcrum plates 106, one of these plates being attached on each side of spring block 100 and extending below the block to place the fulcrum pins 105 in contact with the outer leaves of the leaf spring 101 slightly below the attachment of these leaves to the spring block.

While the stick assemblies described above have the driving gear sectors rotatable about the longitudinal axis B—B with the driven gear sectors rotating about the lateral axis A—A, the reciprocal of this arrangement is equally useful and is shown in Figures 4 and 5. Here the stick 22 is mounted on a laterally extending stick tube 110 which is freely rotatable on a longitudinal shaft 111 journalled in a forward bearing 112. A sector tube 114 is mounted to rotate on longitudinal shaft 111 to rotate in a rear bearing 115.

Sector tube 114 terminates short of stick tube 110 and carries a laterally extending arm 116 on which a right driven sector 117 is mounted. The left driven sector 119 is mounted on a left sector arm 120 extended in the opposite direction to arm 116, and carried by longitudinal shaft 111. Right and left driving sectors 121 and 122 are respectively mounted on the opposite outer ends of stick tube 110 to mesh with the driven sectors. Cables 4 and 5 leading to the hydraulic motors in the wing panels are taken from quadrants 123 and 124 respectively, attached to shaft 111 and tube 114 beyond rear bearing 115.

In the operation of the system shown in Figures 1, 2, and 3, when the stick is moved forwardly or rearwardly away from neutral by the pilot of the airplane, the two driving sectors 25 and 26 engage and simultaneously rotate the driven sectors 15 and 16 in the same direction. This rotation actuates both right and left cables 4 and 5 to cause the hydraulic motors 6 and 7 to move the elevons upwardly or downwardly together, thus providing elevation control for the airplane.

Force spring assembly 75a provides a stick centering force irrespective of airspeed, being useful on the ground and at low airspeeds. At higher speeds the stick centering force of the force spring assembly 75a is augmented by the force developed by the airflow acting on diaphragm 92 in casing 94, because movement of the stick in elevation directions will move cam 85 causing roller 86 to ride out of neutral position, the force on diaphragm 92 tending to return the roller 86 to the lowest cam position.

When the stick is moved laterally for lateral control of the airplane, one driven sector 15, for example, is rotated in one direction, and the other driven gear sector 16 is rotated in the other direction. This action causes the cables to be actuated to control the hydraulic motors to move one elevon upwardly, and the other one downwardly, thereby providing aileron action for lateral control of the airplane.

Any combination of elevation and lateral movements made by the sticks 22 will be faithfully reproduced by the elevons.

It will be noted that when the stick is moved fore and aft only, that drive cranks 44 and 45 move together, and merely rotate spring block 100 without flexing the leaf springs 101. However, when the stick is moved laterally, drive cranks 44 and 45 move in opposite directions, and one roller 104 on one drive crank and one roller on the other drive crank will bear against leaf springs 101 and flex them outwardly. The urge of the leaf springs 101 under these conditions provides a centering force between the two drive cranks 44 and 45 and thus provides a lateral centering force for the stick.

The action of the stick assembly shown in Figures 4 and 5 is similar, except that the shaft 111 and sector tube 114 are rotated in opposite directions for fore and aft movement of the stick. Cross connections of the cables 4 and 5 to the quadrants 123 and 124 will provide elevon movement in the same direction for longitudinal movement of the stick, and in the opposite direction for lateral movement of the stick. In this case, the spring block 100 is mounted between quadrants 123 and 124 with the leaf springs 101 extending upwardly to engage rollers 104 mounted on the quadrants.

Referring again to Figure 1, it will be noted that as the pilot's and copilot's stick assemblies are separated by the drive crank and pulley assembly 35, it might be possible for one of the pilots to move a control surface slightly without moving the other pilot's stick, if there were to be any appreciable backlash in the gears of the mechanism, and in the linkage between the pulleys and the gears. To prevent such backlash, the pilot's yoke and the copilot's yoke are tied together through the backlash levers 50 and backlash cable 51. This cable, when tightened by turnbuckle 52, loads the driving and driven gears in both mechanisms through linkage rods 47 and 49 and all backlash between these assemblies and between these assemblies and pulleys 41 and 42 is completely eliminated in all positions of the sticks, without, however, imposing any substantial resistance to stick movement. This is because the load imposed by the backlash cable operates through a closed loop consisting of one backlash lever 50, the gear sectors of one stick control assembly, the rods 47 and 49 and cranks 44 and 45, elevon levers 29 and 30, of both assemblies, the gear sectors of the other assembly, the backlash lever 50 of the other control stick assembly, and the backlash cable and turnbuckle.

As it is desirable that stick movement in both elevation and lateral control directions be limited, stick yoke 20 carries limit stops 130 contacting sleeves 12 and 14 to limit lateral movement of the stick, as shown in Figure 2. Similar elevation stops 131 are provided aft of the stick assemblies and positioned to contact the top and bottom of gear plate 24 to limit fore and aft travel of the stick. These latter stops 131 have been omitted from the copilot's control stick assembly of Figure 2 for clarity of illustration of other parts.

While both stick assemblies shown and described herein utilize substantially a 1 to 1 gear ratio between the gear sectors, it is to be noted that by changing the gear ratio between the driving sectors 25 and 26 and the driven sectors 15 and 16, it is possible to obtain a mechanical advantage for fore and aft stick movement over the cable system that is different from the mechanical advantage over the cable system for lateral stick movement. Such a differential may be embodied in the system when it is found advisable to move the elevons farther for a given stick movement when used as ailerons, than when these same surfaces are used as elevators.

While the preferred form of the invention as described above utilizes two stick assemblies, the invention can also be utilized with a single stick assembly. In this case the need for complete removal of backlash is not so great, and if desired the backlash provisions can be omitted. If, however, backlash reduction is desired for a single stick installation, it can be provided by use of a second gear sector assembly similar to that of the stick assembly, but without a stick. In this case, the second gear sector assembly can be reduced in size and weight as it will only need to carry the loads imposed by the tight backlash cable 51 on the closed loop just above described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A control system for an airplane, comprising a pilot's control assembly including a pilot's control stick mounted to rotate around intersecting longitudinal and lateral axes in said airplane, a pair of driving gear sectors mounted to be rotated by said stick around an axis coaxial with one of said axes, a pair of driven gear sectors positioned to mesh with said driving gear sectors and rotatable coaxially with the other of said axes, a driving lever connected to move with each of said driven gear sectors, a driven lever connected to move with each of said driving levers, a pair of airplane control surfaces each connected to be moved with movement of a driven lever, said driven levers being coaxially mounted and positioned in side by side and coradial relation when said control stick is in neutral position, and elastic means interconnecting said driven levers and positioned to urge said driven levers into said coradial position when said driven levers are separated in either direction due to rotation of said stick around said longitudinal axis.

2. A control system for an airplane, comprising a pilot's control assembly including a pilot's control stick mounted to rotate around intersecting longitudinal and lateral axes in said airplane, a pair of driving gear sectors mounted to be rotated by said stick around an axis coaxial with one of said axes, a pair of driven gear sectors positioned to mesh with said driving gear sectors and rotatable coaxially with the other of said axes, a driving lever connected to move with each of said driven gear sectors, a driven lever connected to move with each of said driving levers, a pair of airplane control surfaces each connected to be moved with movement of a driven lever, an additional pair of driven gear sectors connected to be respectively rotated by said driven levers, an additional pair of driving gear sectors meshing with said additional driven gear sectors, each pair of driving gear sectors having a backlash lever effectively connected thereto, said backlash levers being substantially parallel, a connection between the ends of said backlash levers, and means for tightening said latter connection to remove backlash between all of said sectors and connections therebetween.

3. Apparatus in accordance with claim 2 wherein a copilot's control stick is attached to said additional driving gear sectors.

4. A control system for an airplane, comprising a pilot's control assembly including a pilot's control stick mounted to rotate around intersecting longitudinal and lateral axes in said airplane, a pair of driving gear sectors mounted to be rotated by said stick around an axis coaxial with one of said axes, a pair of driven gear sectors positioned to mesh with said driving gear sectors and rotatable coaxially with the other of said axes, a driving lever connected to move with each of said driven gear sectors, a driven lever connected to move with each of said driving levers, a pair of airplane control surfaces each connected to be moved with movement of a driven lever, said driven levers being coaxially mounted and positioned side by side and substantially parallel when said stick is laterally centered, elastic means inter-connecting said driven levers, said elastic means including a mounting member freely movable in the same directions as each of said driven levers, two elastically separable spring members attached to said mounting member, first spring contact means attached to one of said driven levers and positioned between said spring members, and second spring contact means attached to the other driven lever and also positioned between said spring members, each of said spring members being arranged to contact both of said spring contact means when said control stick is laterally centered, whereby said driven levers are movable simultaneously in the same direction independent of said spring members and whereby said driven levers are movable simultaneously in opposite directions from said parallel relationship against increasing elastic forces from said spring members.

THOMAS A. FEENEY.
WALLACE B. PIERCE.

References Cited in the file of this patent

UNITED STATES PATENTS

| Number | Name | Date |
|---|---|---|
| 1,348,548 | De Dominicis et al. | Aug. 3, 1920 |
| 1,832,254 | Spanovic | Nov. 17, 1931 |
| 1,869,326 | Ludlow | July 26, 1932 |
| 2,045,269 | Henderson | June 23, 1936 |
| 2,358,919 | Fonck | Sept. 26, 1944 |
| 2,373,575 | Lemonier | Apr. 10, 1945 |
| 2,389,274 | Pearsall et al. | Nov. 20, 1945 |
| 2,445,343 | Tyra | July 20, 1948 |